J. S. HEMENWAY.
DEMOUNTABLE RIM FOR AUTOMOBILES.
APPLICATION FILED DEC. 29, 1915.
1,218,938. Patented Mar. 13, 1917.
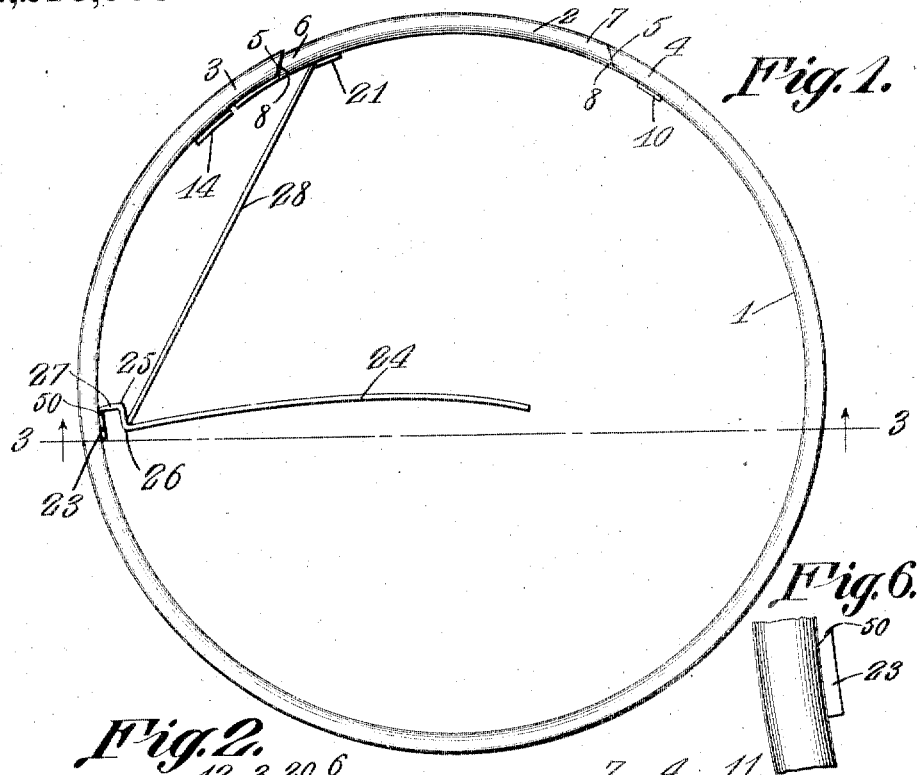
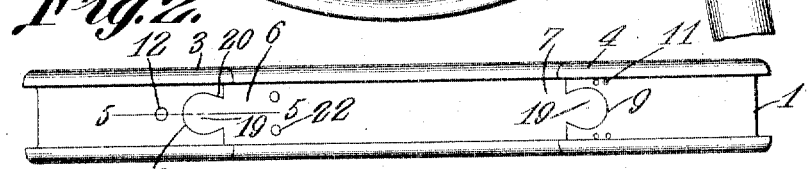
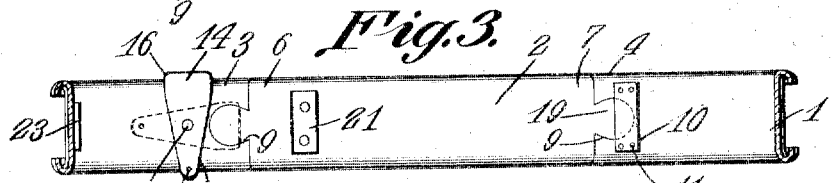
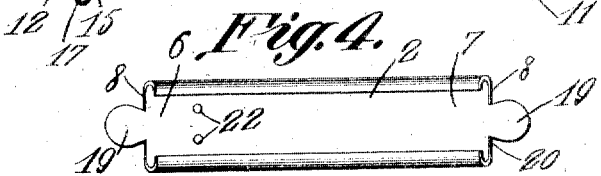
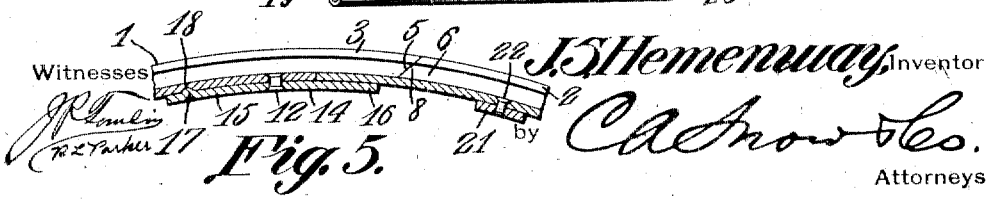
Witnesses J.S.Hemenway, Inventor

UNITED STATES PATENT OFFICE.

JUSTIN SAMUEL HEMENWAY, OF RIVER FALLS, WISCONSIN.

DEMOUNTABLE RIM FOR AUTOMOBILES.

1,218,938.  Specification of Letters Patent.  Patented Mar. 13, 1917.

Application filed December 29, 1915. Serial No. 69,233.

*To all whom it may concern:*

Be it known that I, JUSTIN S. HEMENWAY, a citizen of the United States, residing at River Falls, in the county of Pierce and State of Wisconsin, have invented a new and useful Demountable Rim for Automobiles, of which the following is a specification.

The device forming the subject matter of this application is a wheel rim, adapted to be employed in connection with a pneumatic tire.

The invention aims to provide novel means whereby the rim may be collapsed and expanded.

Specifically, it is one of the objects of the invention to provide a removable rim section of novel form, adapted to be interlocked by novel means with the body portion of the rim to prevent relative movement between the body of the rim and the section, due to circumferential strains.

Another object of the invention is to improve the latch mechanism which, being carried by the body of the rim, constitutes a means for holding the detachable section of the rim in place.

It is within the province of the disclosure to improve generally and to enhance the utility of devices of that type to which the present invention appertains.

With the above and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

In the accompanying drawings:—

Figure 1 shows in side elevation, a wheel rim constructed in accordance with the present invention;

Fig. 2 is a top plan of the rim;

Fig. 3 is a transverse section on the line 3—3 of Fig. 1, parts being omitted;

Fig. 4 is a plan of the removable rim section;

Fig. 5 is a longitudinal section taken approximately on the line 5—5 of Fig. 2;

Fig. 6 is an enlarged elevation showing one of the abutments.

The device forming the subject matter of this application preferably but not necessarily is fashioned from metal throughout and includes a rim comprising a resilient body 1 and a removable section 2. The ends 3 and 4 of the body 1 are beveled as shown at 5, and the ends 6 and 7 of the removable section 2 are inclined as shown at 8 to coöperate with the beveled ends 5 of the body, the construction being such that the section 2 may be removed inwardly, but cannot be removed outwardly.

In the ends 3 and 4 of the body 1 are formed recesses 9 having reduced mouths. Secured to the under face of the end 4 and extended across one of the recesses 9 is a strap 10 held in place by securing elements 11. Owing to the fact that the recess above alluded to is partially bridged across by the strap 10, the said recess may be described as being formed in the outer face of the end 4.

Mounted in the end 3 of the body 1 is a pivot element 12 on which is mounted to swing a latch 14 coöperating with the under face of the end 3. The latch 14 is tapered to define a resilient stem 15 and a head 16. When, as shown in Fig. 3, the latch 14 stands transversely of the rim, the head 16 of the latch is located to one side of the adjacent recess 9, but when the latch extends longitudinally of the rim, then the head 16 underlies the said recess. The resilient stem 15 of the latch 14 and the end 3 are provided with interlocking elements whereby the latch may be held longitudinally of the rim, as indicated in dotted lines in Fig. 3, these interlocking elements embodying a recess 18 formed in the end 3 and a boss 17 on the stem 15 adapted to be received in the recess.

The removable section 2 is provided at its ends with extensions 19 shaped to fit within the recesses 9, the extensions being reduced at 20, adjacent the ends of the section. Obviously, the construction above described is such that when the extensions 19 are received in the recesses 9, the removable section 2 will be interlocked with the body 1 against becoming detached by circumferential strains.

Mounted on the removable section 2 near to the end 6 thereof is an abutment 21 which may be held in place by securing elements 22. An abutment 23 is secured to the inner face of the body 1, nearer to the end 3 of the body than to the end 4 thereof. The invention includes a lever 24 bent upon itself adjacent one end to form an extension 25 defining a finger 27 and a seat 26. Coöperating with the lever 24 and the abutments 23 and 21 in a manner to be described hereinafter, is a thrust bar 28.

In practical operation, one extension 19 on the removable section 2 is placed in the corresponding recess 9 of the body 1 above the strap 10. The other extension 19 is then forced upwardly through the corresponding recess 9 in the end 3. Thereafter, the latch 14 is swung around from the solid line position of Fig. 3 to the dotted line position thereof under which circumstances the head 15 of the latch will extend beneath the adjacent extension 19 and maintain the section 2 in place, the boss 17 on the latch interlocking with the recess 18 in the end 3 of the body 1 of the rim.

Should occasion require, recourse may be had to the lever 24 and the thrust bar 28 for the purpose of mounting the removable section 2 in place. Under such circumstances, the finger 27 of the lever 24 is engaged with the abutment 23, one end of the thrust bar 28 being engaged with the abutment 21, and the other end of the thrust bar being engaged with the seat 26 in the lever 24. By means of the lever 24 and the thrust bar 28, the left hand end of the removable section 2 (Fig. 1) may be pushed outwardly to place. As shown at 50, the abutments 21 and 23 are undercut at their ends to retain a hold, respectively on the thrust bar 28 and the finger 27 of the lever 24.

Having thus described the invention, what is claimed is:—

A wheel rim comprising a body and a relatively short section removable as an entity from the body, the body and both ends of the section being provided with detachably interengaged elements which limit the outward movement of the section, the body and the section being provided with detachably interengaging elements which prevent relative circumferential movement between the section and the body; and members carried by the body and coacting with the second specified interengaging elements of the section to prevent inward movement of the ends of the section, one of said members being movable to permit inward movement of the corresponding end of the section.

In testimony that I claim the foregoing as my own, I have hereto affixed my signature in the presence of two witnesses.

JUSTIN SAMUEL HEMENWAY.

Witnesses:
CHAS. N. WIGER,
F. X. KNOBL.